May 13, 1958 N. F. BLEAKLEY 2,834,615
NON-SYMMETRICAL ADJUSTABLE Y-TYPE CONNECTOR
Filed April 15, 1954 2 Sheets-Sheet 1

INVENTOR.
NORMAN F. BLEAKLEY
BY
Paul J. Ethington
ATTORNEY

May 13, 1958 N. F. BLEAKLEY 2,834,615
NON-SYMMETRICAL ADJUSTABLE Y-TYPE CONNECTOR
Filed April 15, 1954 2 Sheets-Sheet 2

INVENTOR.
NORMAN F. BLEAKLEY
BY
Paul J. Ethington
ATTORNEY

United States Patent Office 2,834,615
Patented May 13, 1958

2,834,615
NON-SYMMETRICAL ADJUSTABLE Y-TYPE CONNECTOR

Norman F. Bleakley, Cedar Rapids, Iowa, assignor to Dearborn Brass Company, Cedar Rapids, Iowa, a corporation of Iowa Application April 15, 1954, Serial No. 423,273

1 Claim. (Cl. 285—151)

This invention relates to a branch connector assembly for use in interconnecting a plurality of conduits or the like. It is more particularly described as Y-fitting assembly for plumbing installations such as the drain connections of double sinks; however the invention is not limited thereto.

There are a number of known assemblies for effecting the connection of the drain openings of double sinks to the waste pipe. In all such connections a trap such as a U-trap is interposed between the drain opening and the waste pipe. It is a common practice for example to use a center connection or end connection in which the conduits from both drains communicate with a common trap which in turn connects to the waste pipe. Although this type of connection is quite simple it has certain disadvantages. For example, during simultaneous flow through both drains, the streams tend to oppose each other at the common juncture with the trap. Another type of connection is commonly used to overcome this objection which utilizes a Y-branch connector. Each drain opening is connected through a trap to one branch of the Y which has its main conduit connected to the waste pipe.

While the latter type of connection may provide suitable flow characteristics its usefulness depends largely upon the relative positions of the waste pipe and the drain openings. In most existing plumbing installations the waste pipe is positioned toward the rear of the sink and may be at any lateral position, though generally it is intermediate the drain openings. Thus, in both new and existing plumbing installations, a conventional Y-branch fitting will not permit connection where the waste pipe is located in extreme positions without the use of an additional series of fittings. Also, where a food disposer unit is to be installed even though the waste pipe is located in a central region, it often requires the additional series of fittings. The disadvantages are obvious. The plumber's time in effecting the connection is unduly increased, the additional fittings add to the expense, and the resulting connection is unsightly. Furthermore, the additional fittings introduce sharp turns in the flow path which restrict the flow of waste and reduce the effectiveness of the system.

Accordingly, it is an object of this invention to overcome the disadvantages of the prior art and to provide an improved branch connector and method of assembly.

A more particular object is to provide a universal branch connector and method of assembly which will permit connection of the drain outlets through the corresponding traps directly to the waste pipe which may be located at any position behind the drain openings.

It is a further object of this invention to provide a branch connector having a pivotal connector on each branch requiring displacement through a minimum angle and yet permits connection of any standard sink.

Another object is to provide a non-symmetrical Y-branch connector provided with a ball and socket joint as a universal connector for spaced conduits.

Another object is to provide a Y-branch connector with each branch including a pivotal connector, one branch being movable through a range of angular movement partially coextensive with and of higher angular value than the range of angular movement of the other branch.

These and other objects and the manner of accomplishment will be apparent from the description following and the accompanying drawings in which.

This invention resides in a non-symmetrical Y-branch connector provided on each of the branch arms with a pivotal joint which is movable through a limited angle. In the assembly with associated conduits it is necessary that the connector permit connection for any position of the Y to the rear of and generally between the drain openings. It has been found that this can be realized with a minimum of angular movement of the pivotal joints by orienting the Y to permit connection for one region and reorienting the Y to permit connection for another region. This is accomplished by correlating the angular positions of the branch arms with the limits of the angular movement of the pivotal connectors. Briefly, it may be stated that with the Y-branch in one orientation the angular branch arms, by movement of the pivotal connectors, may be aligned with and connected to a pair of spaced traps or the like for any position of the Y-branch within a limited range. At the limit of this range if the Y-branch is reoriented by rotating it one-half revolution and if the branch angles are properly related, connection will be permitted for any position of the Y-branch within an additional range. The angular relation between the two branch arms and the angular movement permitted by the pivotal joints must be such that there is some overlap of the angular ranges through which the branch connectors are movable with respect to the main branch.

By this arrangement the necessary angular movement of the pivotal connectors can be reduced to a minimum. The reduction of the required angular displacement in turn permits the use of ball and socket joints of small and economical size. Thus, a ground joint can be employed and the use of a packed joint is avoided.

The invention will be described with respect to a double sink installation. It is to be understood, however, this is only an illustrative embodiment of the invention and its application is by no means so limited.

Figure 1:
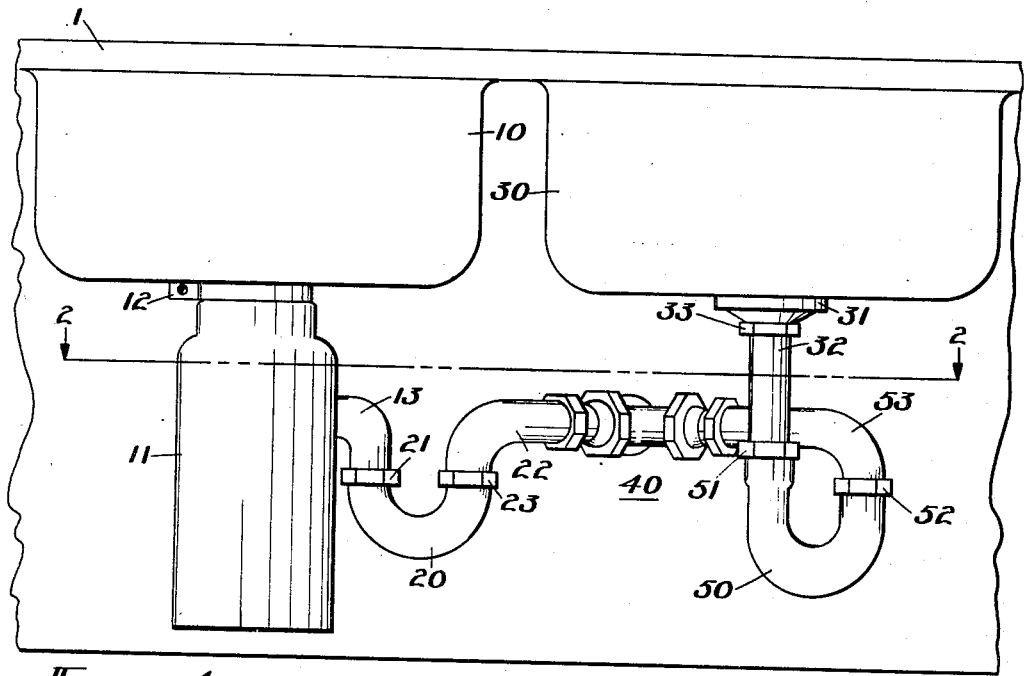
Figure 1 is a front elevational view of a typical installation of the inventive branch connector assembly.
Figure 2:
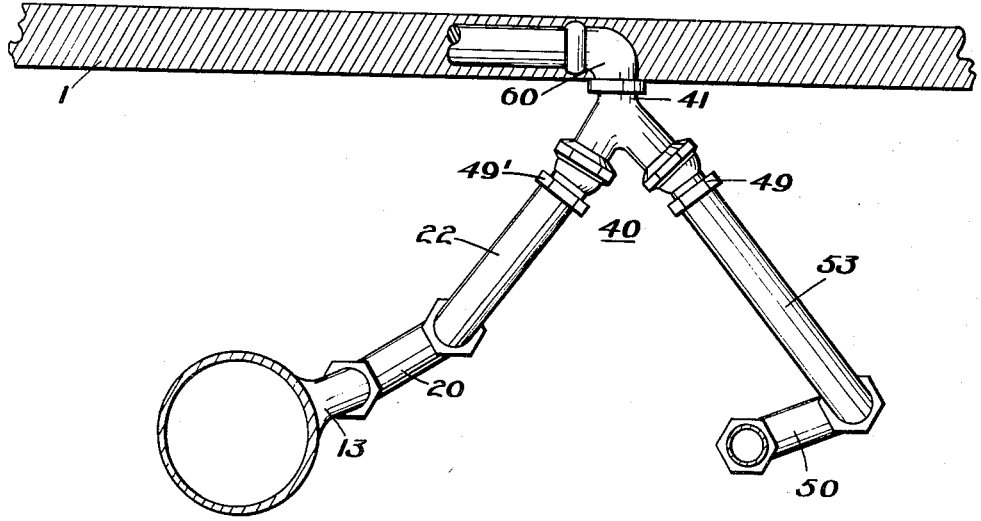
Figure 2 is a plan view of the assembly taken on line 2—2 of Figure 1.

Referring now to the drawings, in Figures 1 and 2 there is shown a double sink installation incorporating the inventive assembly. A double sink having basins 10 and 30 is suitably supported from a wall 1. Depending from the basin 10 at the central portion thereof and aligned with a drain opening is a waste disposer 11 of well known type. The disposer 11 is secured to the basin 10 by means of a clamp 12. Extending laterally from the disposer unit is an outlet conduit 13 opening downwardly. The outlet conduit 13 may extend in any desired direction by rotation of the disposer unit about its own axis. However, it is generally desirable to keep any control buttons or the like toward the front. A U-trap 20 is connected at one end to the outlet 13 and pivotally secured thereto by gland 21. The other end of the trap is connected to quarter-bend conduit 22 by gland 23. The conduit 22 is connected to one branch conduit or arm of Y-connector 40 through a pivotal connector and secured thereto by nut 49'. Main conduit or passage 41 of Y-connector 40 is threadedly connected to waste pipe 60.

Depending from basin 30 below a drain opening is a centrally located threaded boss 31 to which is connected vertical conduit 32 secured to the boss by gland 33. A U-trap 50 is connected at one end to conduit 32 by gland 51 which permits rotative positioning of the trap about the conduit 32. At the other end a gland 52 connects the trap to a quarter-bend conduit 53. The conduit 53 is connected to one branch of Y-connector 40 through a pivotal connector and secured thereto by nut 49. The waste carried by the series of conduits just described passes through the main conduit 41 of the Y-branch connector to the waste pipe 60.

Referring to the plan view of the assembly in Figure 2 the waste pipe 60 is shown in a typical location. However, in many installations the waste pipe may be located on either side of the illustrated position or a different distance rearwardly from the drain openings of the sink. To enable connection of the assembly from such varied and random locations of the waste pipe, the non-symmetrical Y-branch connector 40 is provided which will be described in detail subsequently.

Figure 3:
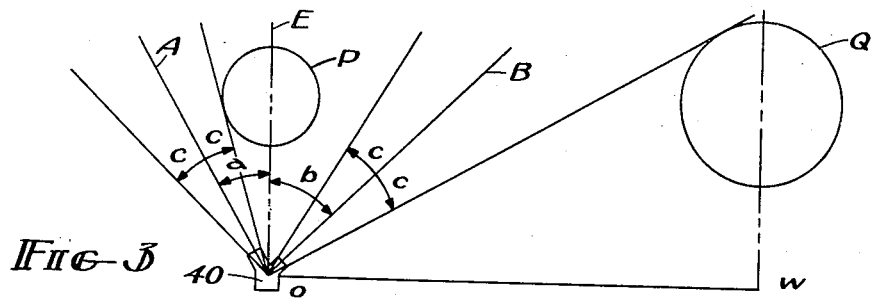
Figure 3 is a diagrammatic illustration showing the assembly for one extreme position of the branch connector.

In Figure 3 there is illustrated schematically a general arrangement which characterizes the features of this invention. It is an obvious condition that for the connection of two conduits the center lines of the connecting members must intersect at the point of connection. Therefore, in schematic form the positions of the members to be connected are represented by the paths of their center lines.

The branch connector 40 may be required in a given installation to take any position on the line $o$—$w$. In Figure 3 the connector is positioned at $o$ and is provided with a first branch A and a second branch B. Branch A is represented by line A which defines the axis of the branch which is displaced an angle $a$ from the center line E of the main conduit or body of the connector. The branch A is provided with a pivotal joint by means of which the center line of the branch is movable through an angle $c$ in either direction from axis A. The branch B is represented by line B displaced an angle $b$ from the center line E and defines the branch B axis. Branch B is provided with a pivotal joint permitting the center line of the branch to be displaced an angle $c$ on either side of axis B.

Figure 4:
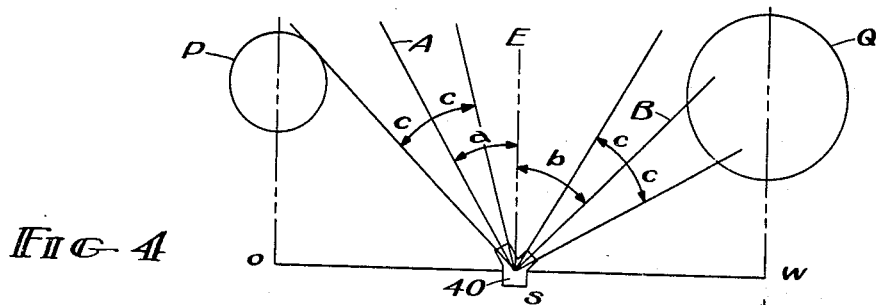
Figure 4 is similar to Figure 3 showing an intermediate position of the connector.
Figure 5:
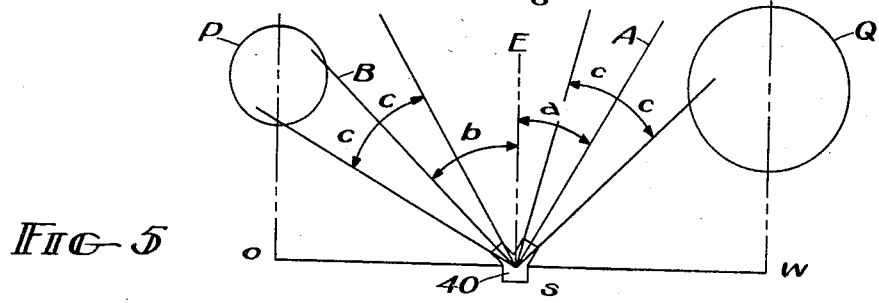
Figure 5 is also a diagrammatic illustration showing the connector in another position with the connector reoriented to permit the connections to be made.

In the schematic representations of Figures 3, 4 and 5 the axes A and B are shown to intersect at a point on line $o$—$w$. In the actual construction of the connector it may be that the intersecting points are spaced slightly from the line $o$—$w$; however, for simplicity in illustration this relation is not shown but may be readily accounted for in designing a particular Y-branch connector.

Referring to Figures 3 and 4 assume that the Y-branch connector must be located at any point within a first region extending from point $o$ to point $s$. The branch angle $a$ is of such value that the movement permitted by the limited pivotal angle $c$ will allow the branch A to intersect the center line path P of a movable conduit such as a pivotally connected U-trap. Thus, connection of branch A can be made with the Y at any point between $o$ and $s$. Also, the branch angle $b$ is of such value that the movement permitted by the limited pivotal angle $c$ will allow connection of branch B to the connector such as a U-trap having center line path Q.

If the Y branch is moved to positions to the right of point $o$, connection of both branches can be made throughout the first region until the position $s$ is reached. This limiting position is illustrated in Figure 4. In this illustrative arrangement the branch A cannot intersect the circular path P if the Y-branch is moved beyond the point $s$ into a second region extending from $s$ to $w$.

At this limiting position $s$ the Y-branch connector is rotated through one-half revolution to the orientation shown in Figure 5. Now the branch B will intersect the center line path P and the branch A will intersect the center line path Q for positions to the right of point $s$. This relation will obtain provided that the range of angular movement of branch B is partially coextensive with and higher than the range of angular movement of branch A. Stated another way, the maximum angle, $b+c$, of branch B must be greater than the maximum angle, $a+c$, of branch A and the minimum angle, $b-c$, of branch B must be less than the maximum angle, $a+c$, of branch A. This provides partial overlap or coextension of the ranges of movement and insures that there will be no "dead spot" or points between the first and second regions of location at which connections cannot be made.

In the illustrative embodiment the pivotal connectors extending from the branches of the Y are connected to movable conduits such as U-traps. It is to be understood that the invention is not restricted to this arrangement. For example, the Y-branches may be required to be connected to fixed conduits with the Y-branch located at any position spaced from and generally between the fixed conduits.

It will now be apparent that by constructing the non-symmetrical Y branch with the angular range of one branch partially overlapping, in angular movement, and higher than the angular range of the other branch, the inventive fitting will permit connection from any point within first and second adjoining regions. The extent of the adjoining regions is made a maximum value while permitting the angle through which each branch must pivot to be a minimum.

Thus, it has become possible to construct a universal Y-branch connector which will connect any standard sink regardless of the location of the waste pipe. Double sinks presently used are of three different standard sizes having the drain openings spaced at 16, 21 and 24 inches.

Figure 6:
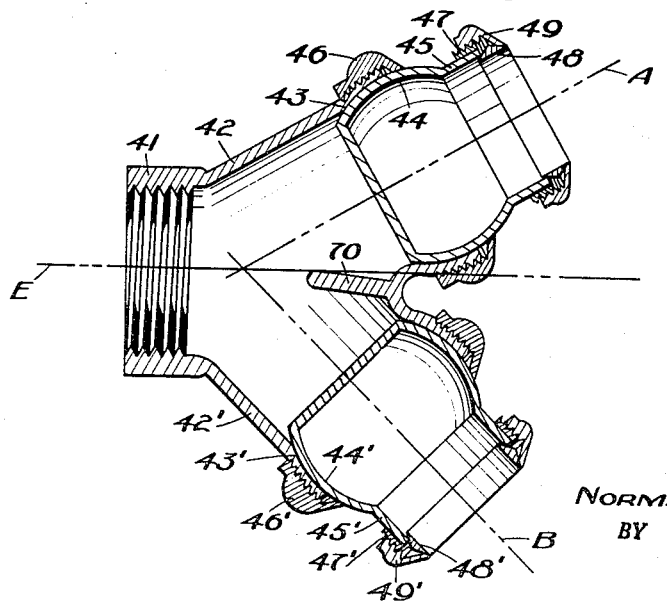
Figure 6 is a cross sectional view of the Y-branch connector and the pivotal branch connectors.

A detailed view of a universal Y-fitting for any standard double sink constructed in accordance with this invention is shown in Figure 6. A body portion of the Y-branch may suitably be of cast brass and includes a main branch 41 defining a main axis E. Extending angularly from the main axis is a first branch or arm 42 defining a branch axis A. In the illustrative embodiment the angular displacement between the main axis E and the branch axis A is 30 degrees. A second branch conduit or arm 42' extends at an angle of 45 degrees from the main axis E and defines a branch axis B. A web or flow divider 70 extends from the juncture of the two branch conduits. This flow divider causes the flow from the branches to merge evenly without opposition and provides equal areas of the passages.

The branch conduit 42 terminates in a flared end portion having a spherical inner surface forming a ball seating portion or socket 43 of a ground joint. Engaging the seating portion 43 is a spherical portion or ball 44 terminating in a cylindrical connector portion 45. The ball and connector portion are desirably formed integrally from expanded tubing although other structures such as a casting would be suitable. The ball 44 is snugly urged into engagement with socket 43 by a threaded nut 46 having a flanged outer edge engaging the outer surface of the ball. At the outer end of the connector portion 45 is an externally threaded ring member 47 suitably secured thereto as by brazing or soldering. Disposed interiorly of the outer end of connector portion 45 is annular ring member 48 adapted to receive a connector conduit.

The ring member 48 is provided with an outer surface of wedge shape in cross section. The nut 49 threadedly engages ring member 47 and has an annular flange which may be tightened against one wedge surface of ring 48 urging the other wedge surface into sealing engagement with tubular portion 45.

The other branch 42' has a ball and socket and connector construction identical to that just described. Like members of the two branches have like reference numerals and the description is therefore not repeated. It is to be noted that the angular extent of the ball and socket joints is quite limited permitting a small joint having excellent sealing properties. In the exemplary embodiment each ball and socket joint permits pivotal motion through 15 degrees about the branch axis or a total pivot angle of 30 degrees.

The manner of connecting a standard double sink will now be described as being illustrative of the general method. Recapitulating, the standard double sinks are provided with drain openings spaced 16, 21 or 24 inches between centers. The openings are positioned approximately 14 inches forward from the rear edge of the sink, and the waste pipe may take any position adjacent the rear edge and between the drain centers. Either drain opening may be provided with a conventional trap or a food disposer and trap or other accessory. In the specific embodiment described the Y-fitting has one branch arm at 30 degrees and the other branch arm at 45 degrees from the center line of the fitting. Each branch arm has a pivotal joint movable through 15 degrees from the center line of the branch.

As noted hereinbefore, the pivotal joints add not only to the flexibility of the Y-fitting, but also they increase the amount of the angular range, as measured by an arc struck from line A to line B with the center of the arc at the intersection of the lines A and B on the main axis E. Additionally, the arrangement is such that even though the lines A and B define angles of different value relative to the axis E, the connector portions 45 are adapted to pivot to where they assume a like angular relation with respect to the main axis E of the main branch 41. The purpose for this is to obviate the previously mentioned "dead spot." This arrangement is provided by adapting each connector portion 45 to be pivotally movable at a point along its respective branch axis A or B at an angle of 15 degrees relative thereto.

Thus, as a connector may pivot a total of 30 degrees relative to its respective axis and in the plane of the branch axes A and B, applying this additional angular value to each of the 30 and 45 degree values of the branch axes A and B respectively, it is to be noted that the latter values may vary from approximately 15 to 45 degrees, and from 30 to 60 degrees respectively, wherein the apex or intersection of the limit lines defining the new angular value of 105 degrees relative to the main axis E falls at a point on that axis a spaced distance from the apex of branch lines A and B. As the upper limit of the lower range is greater than the lower limit of the upper range, upon one-half rotation of the Y-fitting, the upper and lower limits will overlap and thereby obviate any "dead spot," while providing for a greater flexibility of the Y-fitting.

For installing the fitting the main passage of the Y branch is first connected to the waste pipe. It may then be rotated about the main passage to successive horizontal positions. At each such position or orientation the branch arms are deflected through their respective ranges of angular movement. In one such orientation the branch arms will be capable of deflection which will cause the arms to intersect the path or position of the corresponding U-traps. Thus, the U-traps and the branch arms may be connected. A method which may be employed, equivalent to the above method, is to identify the orientations of the Y-branch with the region in which a given orientation will permit connection. Thus, the plumber must merely note the region in which the waste pipe is located, connect the main passage to the waste pipe, rotate the Y-branch to the corresponding orientation and deflect the branch arms to intersect and connect with the corresponding traps or conduits.

This invention has been described with respect to a particular embodiment and illustrated as a double sink connector. However, many modifications and applications will now occur to those skilled in the art. For a definition of the invention reference is made to the appended claim.

I claim:

A non-symmetrical Y-fitting for fluid transmission therethrough, comprising a main body portion having a main axis, a first branch arm formed integral with one side of said body portion and having a main axis secondary to said first main axis and extending at substantially a 45 degree angle relative thereto, a second branch arm formed integral with the other side of said body portion and having a main axis secondary to said first main axis and extending at substantially a 30 degree angle relative thereto, said axes lying in but one plane and said secondary axes forming the radial limits of a first radial arc having an angular value equal to the combined angles therebetween, and a connector member corresponding to and being pivotally connected at the terminal end of each branch arm whereby the axis of said connector member has an angular movement relative to the axis of said branch arm of approximately 15 degrees on any side thereof, each said connector member being pivoted along the branch arm axis a spaced distance from the intersection of said main axes whereby, upon movement of both said connectors within said plane, a second radial arc is formed having an apex on said first main axis and encompassing and extending the angular value of said first radial arc substantially 15 degrees from each limit thereof relative to the first main axis, and wherein the connector axes are movable into a substantial like angular relation with said first main axis.

References Cited in the file of this patent

UNITED STATES PATENTS

| Number | Name | Date |
|---|---|---|
| 1,066,329 | Schwedler | July 1, 1913 |
| 1,099,220 | Ward | June 9, 1914 |
| 1,378,054 | Pratt | May 17, 1921 |
| 1,452,779 | Barry | Apr. 24, 1923 |
| 1,679,276 | Slining | July 31, 1928 |
| 2,342,757 | Roser | Feb. 29, 1944 |
| 2,567,165 | Buskirk | Sept. 11, 1951 |
| 2,644,543 | Russell | July 7, 1953 |

FOREIGN PATENTS

| Number | Country | Date |
|---|---|---|
| 19,237 | Great Britain | Nov. 7, 1891 |
| 68,287 | Germany | Apr. 28, 1893 |
| 405,207 | Germany | Nov. 1, 1924 |